Jan. 17, 1950   C. L. HOFF   2,495,101
MOTOR VEHICLE DRIVE
Filed Sept. 8, 1945   2 Sheets-Sheet 1
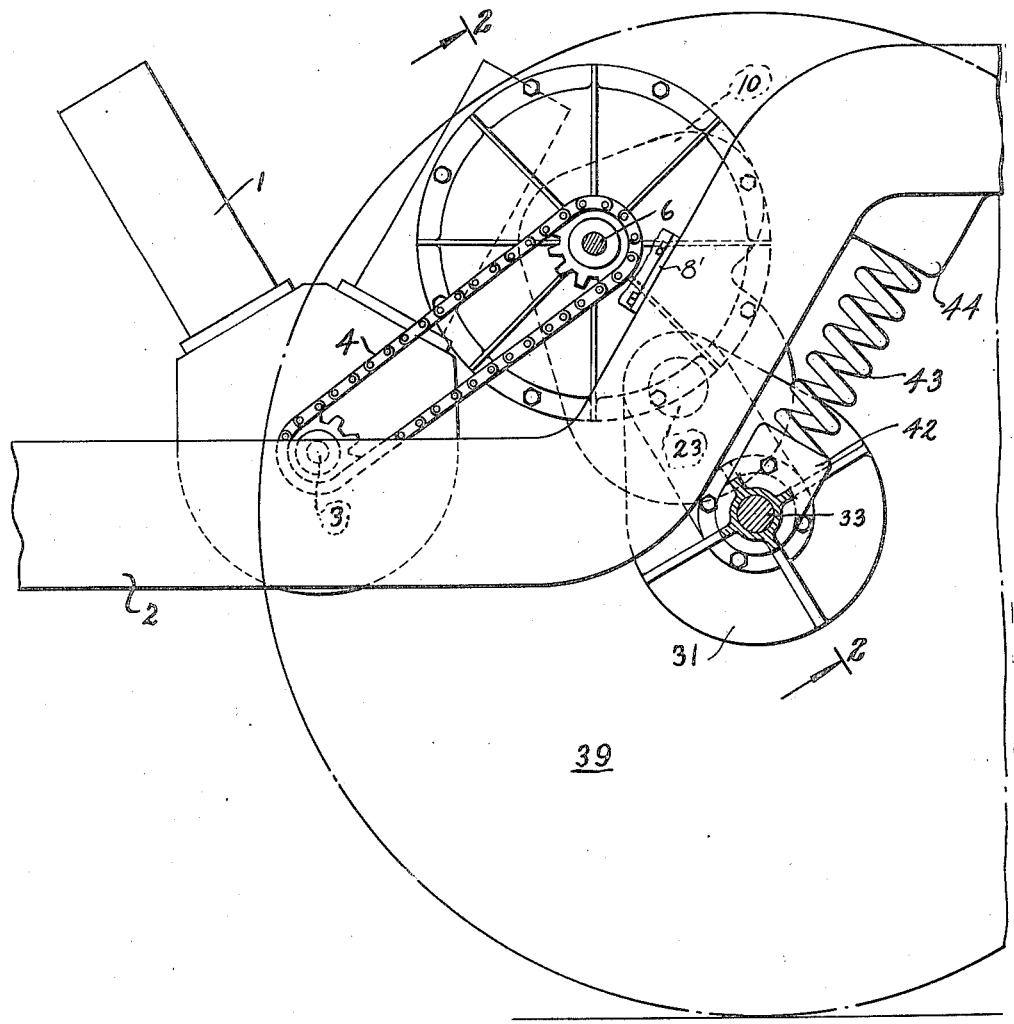
C. L. HOFF
INVENTOR.
BY Henry J Savage
ATTORNEY Jan. 17, 1950     C. L. HOFF     2,495,101
MOTOR VEHICLE DRIVE
Filed Sept. 8, 1945     2 Sheets-Sheet 2
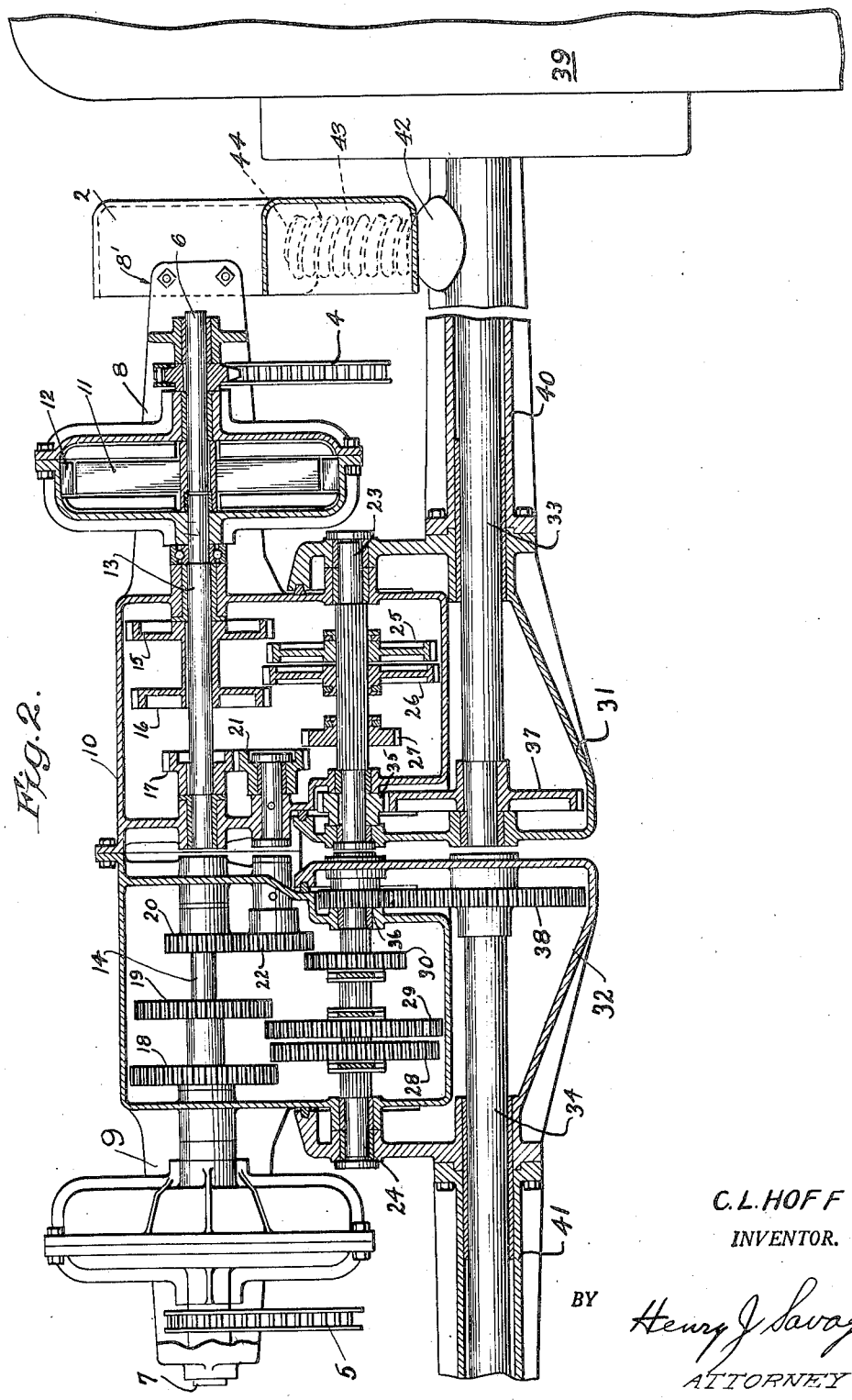
C. L. HOFF
INVENTOR.
BY Henry J. Savage
ATTORNEY

UNITED STATES PATENT OFFICE 2,495,101

MOTOR VEHICLE DRIVE

Carlton L. Hoff, York, Pa.

Application September 8, 1945, Serial No. 615,153

7 Claims. (Cl. 180—6.2)

My invention pertains to motor vehicle drives and is adapted for use on all kinds of motor vehicles including passenger cars, trucks, buses, and tractors.

Among the many objects and advantages of my invention are decreased cost of construction and operation by eliminating the usual differential, drive shaft, universal couplings, and clutch.

Another important object is to increase the traction of the rear wheels by having the weight of the engine and intermediate driving mechanism mounted adjacent thereto instead of near the front wheels as in motor vehicles heretofore. This also makes easier steering by lessening the weight on the front wheels and decreases the tendency of the rear end to swing around or skid on slippery streets.

Another object is to do away with all angular drives and bevel gears by having all drive and power shafts parallel so that they can be driven by spur gears or chains and sprockets thereby increasing the efficiency of power transmission.

Another object is to provide independent drives for the rear wheels so that full power may be transmitted to one wheel in case the other slips, thereby having tractive power always available, yet permitting differential drive of the wheels when turning.

Still another object is to mount the rear wheels independently in such manner that when one wheel strikes an obstruction in the road the shock is absorbed by resilient means interposed between the wheel and vehicle frame and not transmitted to the opposite wheel.

Another object is to provide a weight distribution and wheel mounting in a motor vehicle such that the ratio of unsprung weight to sprung weight is a minimum thereby reducing road shocks and increasing the ease of riding.

Another object is to provide in a motor vehicle a two part rear axle having independent suspensions and independent drives.

The above and other objects and advantages are secured by my invention, one embodiment of which I have illustrated in the accompanying drawings.

Fig. 1 is a side elevation, with parts in section, showing a rear wheel drive.

Fig. 2 is a section taken substantially on line 2—2 of Fig. 1.

An engine 1 is mounted near the rear end of the vehicle frame 2 and has a crank shaft 3 extending transversely of the frame. Each end of the crank shaft has a sprocket from which chains 4, 5 drive two impeller shafts 6, 7 rotatably mounted in brackets 8, 9 secured to a transmission casing 10. The casing 10 is supported on the frame 2 in any convenient manner as by extensions of the brackets 8, 9, as shown at 8'. Each impeller shaft carries an impeller 11 which cooperates with a runner 12 to provide a fluid drive for each of two drive shafts 13, 14 that are supported in bearings in the transmission housings. Each of these drive shafts has three gears 15, 16, 17 and 18, 19, 20 keyed thereto. The gears 15, 16 and 18, 19 are for forward drive of the vehicle while the gears 17 and 20 are for reverse drive. The gear 17 meshes with an idler 21 and the gear 20 with an idler 22.

Two transmission shafts 23, 24 are journaled in the housing parallel to the drive shafts. These transmission shafts are splined and have the transmission gears 25, 26, 27 and 28, 29, 30 slidable thereon. These gears are shifted on the spline shaft in the usual manner and when gears 26, 29 mesh with gears 16, 19, the vehicle is driven forward at slow speed. When the gears 25, 28 are in mesh with the gears 15, 18 then the vehicle is driven forward at high speed. When gears 27, 30 mesh with gears 21, 22 then the vehicle is driven in reverse.

Two rear axle housings 31, 32 are journaled on the extended ends of the transmission shafts 23, 24 and are provided with bearings to support the two rear axles 33, 34. Gears 35, 36 keyed to the transmission shaft mesh with gears 37, 38 keyed to the rear axles to drive the same. Each rear axle at its outer end carries the usual traction wheel or tire 39.

Each of the housings 31, 32 has an extension or sleeve 40, 41 through which the axle extends, and adjacent the traction wheel and under the frame member 2 has an abutment 42 that forms a seat for one end of the coil spring 43, the other end of which bears on a similar abutment 44 on the frame.

Only one traction wheel, spring and frame member are shown, but it is understood that these elements are duplicated on the opposite side.

From the foregoing it will be seen that I have provided a drive for a motor vehicle wherein the engine and transmission are mounted at the rear end of the vehicle so that substantially all of their weight is supported by the traction wheels which gives increased traction, prevents skidding and makes all of the parts readily accessible from the rear end of the vehicle.

The two traction wheels are driven independently, each through its own fluid drive and if one wheel should lose its traction or slip, power will continue to be transmitted to the opposite wheel so that stalling is prevented.

When one of the wheels strikes an obstruction such as a stone or hole in the road, only the wheel that strikes the obstruction is effected. That wheel and the rear axle housing will pivot about one of the transmission shafts 23, 24 and the opposite wheel and its housing are not effected by the shock. The spring 43 cushions the shock so that very little jar is felt in the vehicle. The usual snubbers or hydraulic shock absorbers may be used to slow up the recoil of the springs 43.

It will be noted that the unsprung weight is very small with respect to the total weight of the vehicle. The total unsprung weight is only that of one of the driving wheels, its axle and housing. The ratio of the weight of these unsprung parts is very small with respect to the weight of the entire vehicle which will greatly reduce road shock and contribute to easy riding.

I have not illustrated the mechanism for shifting the transmission gears on the spline shafts, but this may be accomplished in the usual manner and may be arranged so as to shift the gears either simultaneously or independently on the two spline shafts. Also a different number of forward and reverse speeds may be provided for.

By mounting the engine and all the driving mechanism at the rear as I have done, I do away with the drive shaft which in ordinary motor vehicles extends from the engine at the front to the differential on the rear axle. It will also be noted I did not employ a clutch, this not being essential with the fluid drive, and that I also have dispensed with all bevel gears. All the shafts, including the engine shaft, are parallel so that they can be driven either by chains or spur gears.

I have shown the axles 33, 34 as being driven by gears 37, 38 at the inner ends, but these axles may be driven by chains and sprockets from the outer ends of the shafts 23, 24.

In Fig. 1, I have shown a chain and sprocket drive from the engine shaft 3 to the impeller shaft 6, but any other suitable form of drive may be used.

When the invention is applied to farm and industrial tractors where the speeds are very slow, the spring cushions 43, may be omitted and the axle housings 31, 32 may be fixed with respect to the frame.

I have illustrated and described one specific embodiment of my invention but it is to be understood that this is illustrative only and not a limitation thereon. I contemplate many variations and modifications of the invention as illustrated and claim all such that may come within the terms or scope of my claims or be equivalents thereof.

Having thus described my invention, what I claim is:

1. In a motor vehicle, the combination of a vehicle frame, an engine rigidly mounted on the frame and having a crank shaft, two rear axle housings pivotally supported on opposite sides of said frame, a rear axle rotatably supported in each housing, said axles being in alignment and extending transversely of the frame, a traction wheel secured to the outer end of each axle, independent selective driving means including variable speed transmission mechanism for independently driving each axle from the engine shaft, and cushioning means interposed between each axle housing and the vehicle frame.

2. In a motor vehicle, the combination of a vehicle frame, an engine mounted thereon, a casing mounted on the frame adjacent its rear end and extending transversely thereof, two impeller shafts rotatably mounted in said casing at opposite ends thereof, impellers mounted on said shafts, means for driving said shafts and impellers from said engine, two drive shafts mounted in said casing in alignment with said impeller shafts, a runner mounted on each drive shaft adjacent to each impeller and adapted to be driven thereby, two transmission shafts mounted in the casing, means for driving the transmission shafts from the drive shafts at selected speeds, two rear axles mounted to pivot about the common axis of said transmission shafts, means for driving the rear axles from the respective transmission shafts, and cushioning means between each axle and the vehicle frame.

3. In a motor vehicle, the combination of a vehicle frame, an engine fixedly mounted thereon, a casing fixedly mounted on the frame adjacent its rear end, two impeller shafts rotatably mounted in said casing at opposite ends thereof and extending transversely of the frame, an impeller fixed on each of said impeller shafts, means for driving said impellers and shafts from the engine, two drive shafts mounted in said casing and each having a runner adapted to be driven by one of said impellers, two transmission shafts rotatably mounted in said casing parallel to said drive shafts, means for selectively driving said transmission shafts at different speeds from the respective drive shafts, two rear axles pivotally mounted with respect to said transmission shafts, means for driving each rear axle from one of said transmission shafts, and a traction wheel fixed on the outer end of each axle, whereby said traction wheels will be driven independently.

4. In a motor vehicle, the combination of a vehicle frame, an engine fixedly mounted thereon, a casing fixedly mounted on the frame adjacent its rear end, two impeller shafts rotatably mounted in said casing at opposite ends thereof and extending transversely of the frame, an impeller fixed on each of said impeller shafts, means for driving said impellers and shafts from the engine, two drive shafts mounted in said casing and each having a runner adapted to be driven by one of said impellers, two transmission shafts rotatably mounted in said casing parallel to said drive shafts, means for selectively driving said transmission shafts at different speeds from the respective drive shafts, two rear axles pivotally mounted with respect to said casing, means for driving each rear axle from one of said transmission shafts, cushioning means between each axle and said frame, and a traction wheel fixed on the outer end of each axle, whereby said traction wheels will be driven independently.

5. In a motor vehicle, the combination of a vehicle frame, an engine mounted on said frame near the rear end with its power shaft extending transversely of the frame, two impeller shafts mounted in a casing fixed to the frame and driven from said engine shaft, two drive shafts mounted in said casing, two fluid drives connecting said impeller shafts to the respective drive shafts whereby the latter are driven independently from the engine, two transmission shafts rotatably mounted in said casing, transmission mechanism for selectively driving said transmission shafts from said drive shafts, two axle housings mounted to pivot about the axis of said transmission shafts, an axle rotatably mounted in each housing, means for driving the axles from the respective transmission shafts, cushioning means interposed between said rear axle housings and the frame, and a traction wheel on the outer end of each axle.

6. In a motor vehicle, the combination of a vehicle frame, an engine fixedly mounted on the frame near the rear end thereof with its power shaft extending transversely thereof, two transmission shafts mounted on said frame parallel to said engine shaft, means including variable speed gearing and a fluid drive mounted on said frame and connected for driving said transmission shafts independently from the engine at selected speeds, two traction wheels supporting the rear end of the frame and having pivotal movement with respect thereto, and means for selectively driving each of said traction wheels from one of the respective transmission shafts.

7. In a motor vehicle, the combination of a vehicle frame, an engine fixedly mounted on the frame with its power shaft extending transversely thereof, two rear axles pivotally supported with respect to the frame with their axes in alignment but independently movable with respect to the frame, a traction wheel fixed on the outer end of each axle and driven thereby, transmission mechanism mounted on said frame for independently driving said axles at different selected speeds, and a fluid drive mounted on the frame for driving each axle independently from the engine thru the transmission mechanism.

CARLTON L. HOFF.

REFERENCES CITED

The following references are of record in the file of this patent:

UNITED STATES PATENTS

| Number | Name | Date |
| --- | --- | --- |
| 495,709 | Richmond | Apr. 18, 1893 |
| 1,246,452 | Monroe | Nov. 13, 1917 |
| 1,348,385 | Winslow | Aug. 3, 1920 |
| 1,735,404 | Masury | Nov. 12, 1929 |
| 2,004,215 | Peterson | June 11, 1935 |
| 2,012,653 | Blackmon | Aug. 27, 1935 |
| 2,066,530 | Hoffman | Jan. 5, 1937 |
| 2,255,773 | Heftler | Sept. 16, 1941 |
| 2,287,498 | Scofield | June 23, 1942 |

FOREIGN PATENTS

| Number | Country | Date |
| --- | --- | --- |
| 344,620 | Italy | Nov. 13, 1936 |